United States Patent [19]

Wright et al.

[11] Patent Number: 4,928,201

[45] Date of Patent: May 22, 1990

[54] CURRENT COLLECTOR

[76] Inventors: Murray J. Wright, P.O. Box 19-574; Gordon V. Ritchie, 21 Mavin Road, both of Christchurch, New Zealand

[21] Appl. No.: 274,455

[22] Filed: Nov. 21, 1988

[51] Int. Cl.[5] .......... H01G 47/00

[52] U.S. Cl. .......... 361/215; 361/220

[58] Field of Search .......... 439/92, 95–97, 439/448; 361/215, 212, 220; 417/313, 572

[56] References Cited

U.S. PATENT DOCUMENTS

| | | | |
|---|---|---|---|
| 2,159,163 | 5/1939 | Jolliffe | 439/448 |
| 2,811,674 | 10/1957 | Smith | 361/215 |
| 2,969,484 | 1/1961 | Suckow | 439/92 |
| 4,404,171 | 9/1983 | Satoh et al. | 361/212 |
| 4,694,375 | 9/1987 | Devins et al. | 361/212 |
| 4,715,086 | 12/1987 | Johanson et al. | 361/220 |

FOREIGN PATENT DOCUMENTS

| | | | |
|---|---|---|---|
| 530233 | 7/1931 | Fed. Rep. of Germany | 361/212 |

*Primary Examiner*—Gary F. Paumen

*Attorney, Agent, or Firm*—Fleit, Jacobson, Cohn, Price, Holman & Stern

[57] ABSTRACT

A current collector for pumps, filters, heater housings and the like, the collector comprising a length of conductive wire wound spirally into a sleeve or cone, the shaped length of wire being adapted for placement in an inlet or outlet port of a pump, filter, heater housing and the like with one end thereof connected by a connector to a grounded (earth) connection. The length of conductive wire can be a length of stainless steel wire.

4 Claims, 1 Drawing Sheet

CURRENT COLLECTOR

FIELD OF THE INVENTION

This invention relates to a current collector and more particularly to a device for pumps, filters, heater chambers and the like which include electric heating elements, to collect any current leakage from the element(s) to the fluid being heated.

BACKGROUND TO THE INVENTION

At present in countries in which wiring regulations do not require the use of a ground wire connected to ground to provide protection against leaked electric current it is a wiring requirement that a current collector be incorporated in association with an electric element. At present current collectors are sheaths which surround the element and the regulations require that the collector be five (5) times the length of the diameter of the pipe carrying the element. This means that the sheath is inevitably an elongate fitting which restricts the shape and dimensions of any unit incorporating the current collector and its associated electric element. The wiring requirements stipulate that any current measured in the fluid must be less than 5 milliamps.

An object of the invention is therefore to provide a current collector which meets wiring requirements and is usable as an alternative to existing current collectors.

Further objects and advantages of the invention will become apparent from the following description which is given by way of example only.

SUMMARY OF THE INVENTION

According to the present invention there is provided a current collector for pumps, filters, heater housings and the like, the collector comprising a length of conductive wire wound spirally into a sleeve or cone, the shaped length of wire being adapted for placement in an inlet or outlet port of a pump, filter, heater housing and the like with one end thereof connected by a connector to a grounded (earth) connection.

The length of conductive wire can be a length of stainless steel wire.

Further aspects of the invention will become apparent from the following description which is given by way of example only.

DESCRIPTION OF THE PREFERRED EXAMPLE

Figure 1:
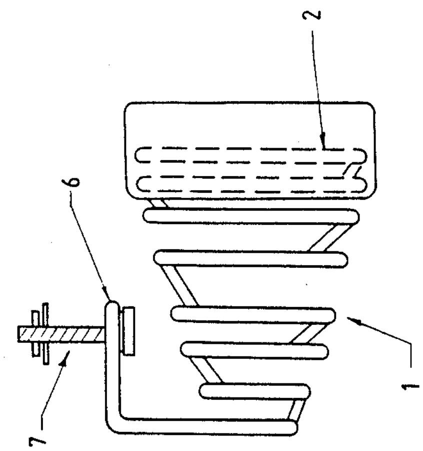
FIG. 1 shows a side view of a current collector according to the invention.

In FIG. 1 is shown a current collector 1 constructed from a length of spirally wound stainless steel. One end 2 of the collector 1 is mounted in a polyvinyl chloride (PVC) ring the diameter of which is selected so that it can be slidingly engaged in an inlet 3 or outlet 4 of a wet end of a pump unit 5 shown in FIG. 2. The other end 6 of the collector 1 is adapted for connection to a grounding lug or connector 7 which is fitted through a hole 8 in the end housing 9 of the pump unit 5. An end view (the direction of arrow 10 in FIG. 1) of the collector 1 shows that a high proportion of any water flowing passed the collector 1 must contact the collector 1 to thereby improve current collection.

In use the grounding lug 7 of a pair of current collectors inserted one in each of the inlet 3 and outlet 4 are linked and are grounded to earth by a wire connected to an earth connection.

The pump 5 in the example has an electric element 11, a seal assembly 12, a set of shims 13, bolt 14 and associated nut and washer 16, flinger 17, adaptor plate 18, impellor 19, diffuser 20, O ring seals 21, 22 and nose section 23. The parts are assembled to form a wet end of a pump. The adaptor plate 18 being linked to a motor housing (not shown) which is adapted to drive the flinger 17.

Figure 2:
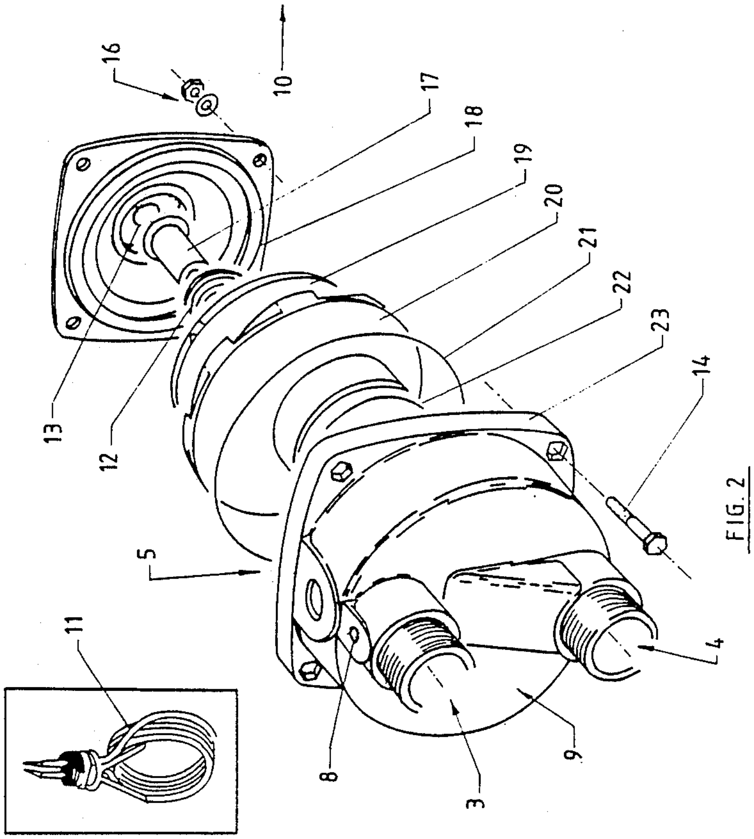
FIG. 2 shows a perspective view from a wet end of a pump unit in which two of the current collectors shown in FIG. 1 can be fitted.

In use in experiments a pump of the type shown in FIG. 2 has been tested and with current collectors of the type shown in FIG. 1 in both the inlet and outlet between 1.3–5 milliamps of leaked current was produced when the electric element 11 was deliberately fractured.

Thus by this invention there is provided a current collector for pumps, filters, heater housings and the like which include electric heating elements to protect against current leakage in the event of an element fracturing.

A particular example of this invention has been described and it is envisaged that improvements and modifications can take place without departing from the spirit and scope of the appended claims.

What we do claim and desire to obtain by Letters Patent of the U.S. is:

1. A current collector for a pump, filter, or heater housing, the collector comprising a length of conductive wire wound spirally into a cone-like sleeve, a large end of the spiral being mounted in a plastic ring, the spiral being dimensional for sliding engagement in an inlet or outlet port of a pump, filter or heater housing with one end of said wire being connected by a connector to a grounded connection to prevent build-up of a static charge in said port.

2. A current collector as claimed in claim 1 wherein the length of conductive wire is a length of stainless steel wire.

3. A current collector as claimed in claim 1 wherein an end of the spiral opposite the large end is connected to a grounding lug connector.

4. A pump, filter or heater housing incorporating in an inlet and outlet port thereof a current collector as claimed in claim 1.

* * * * *